United States Patent [19]

Campbell et al.

[11] 4,415,073
[45] Nov. 15, 1983

[54] AUTOMATIC HUB CLUTCH

[75] Inventors: Chris A. Campbell, Janesville, Wis.; Robert B. Overbeek, Rochelle, Ill.

[73] Assignee: Dana Corporation, Toledo, Ohio

[21] Appl. No.: 152,635

[22] Filed: May 23, 1980

[51] Int. Cl.³ .............................................. F16D 43/20
[52] U.S. Cl. .................................... 192/54; 192/93 A
[58] Field of Search ............... 192/67 R, 89 A, 93 R, 192/93 A, 54, 35, 20; 403/1

[56] References Cited

U.S. PATENT DOCUMENTS

| | | | |
|---|---|---|---|
| 3,005,599 | 10/1961 | Padelt | 192/93 R |
| 3,129,797 | 4/1964 | Orcutt et al. | 192/93 A |
| 3,217,847 | 11/1965 | Petrak | 192/67 R |
| 4,262,785 | 4/1981 | Anderson et al. | 192/54 |
| 4,269,294 | 5/1981 | Kelbel | 192/54 |
| 4,282,959 | 8/1981 | Schachner | 192/67 R |

Primary Examiner—George H. Krizmanich
Attorney, Agent, or Firm—Robert M. Leonardi

[57] ABSTRACT

An automatic hub clutch for the front wheels of a four-wheel drive vehicle which enables said wheels to automatically become engaged or disengaged from the front axle shaft when the transfer case of the vehicle is shifted to the required operating mode. The hub clutch comprises a plurality of gears the engagement of which is carried out through a control assembly that includes a control plate which forces a plurality of ball members over a cam surface for compressing a spring member to move the gear members into engagement with one another. The gear members are moved out of engagement under the action of a spring when the ball members are moved over the cam surface in the opposite direction.

15 Claims, 4 Drawing Figures

AUTOMATIC HUB CLUTCH

BACKGROUND OF THE INVENTION

The present invention relates to Joints and Connections and more specifically to selectively engageable hub to shaft connection.

It is well known in the prior art to have vehicles with optional two or four-wheel drive wherein the two-wheel drive is customary for city and normal highway driving. The four-wheel drive is usually employed in city driving during unusual winter weather conditions, such as snowstorms, and in off highway driving wherein the terrain is rough or sandy and two-wheel traction would not be capable of moving the vehicle. In vehicles of this type, special locking or clutch engaging hubs are utilized for mounting the front wheels of four-wheel drive vehicles on their front axles and said hubs can be manually locked or unlocked.

The prior art patents to Kapusta, U.S. Pat. No. 3,125,363 dated Mar. 17, 1964 and U.S. Pat. No. 3,184,258 dated May 18, 1965 are typical of the aforementionedd type of locking or clutch engaging hubs. This is also true with respect to the patent to Wilson, U.S. Pat. No. 3,669,476 dated June 13, 1972 which is owned by the assignee of the present application.

SUMMARY OF THE INVENTION

This invention relates to a hub clutch for automatically engaging and disengaging the front axle shaft of a four-wheel drive vehicle when the transfer case is shifted to the required operating mode.

The engagement of the front axle shaft with the front wheels of a four-wheel drive vehicle is accomplished through a control assembly and a stationary gear connected to the wheel and a sliding gear carried by the shaft. The control assembly includes a control plate and cam with ball members which are driven over the cam surface by said plate that is splined to the axle shaft. The foregoing results in the sliding gear engaging the stationary gear which are then mechanically connected through a curvic coupling whereby the axle shaft then drives the front wheel. This arrangement is carried out for both of the front wheels and thus overcomes the necessity of the vehicle operator having to get out of the vehicle to manually lock a pair of hubs.

The two gears are readily disengaged when the transfer case is shifted into two-wheel drive and the vehicle is backed up resulting in the control assembly operating in the reverse of the aforementioned engagement procedure so that the axle shaft stops rotating and become disconnected from the hub. The device of the present invention is bidirectional in that it will transmit torque in the forward or reverse directions. Furthermore, in the present device actuation torque is not required, only the rotation of the axle shafts thereby making the instant device more efficient than prior devices.

DESCRIPTION OF THE PREFERRED EMBODIMENT

Figure 1:
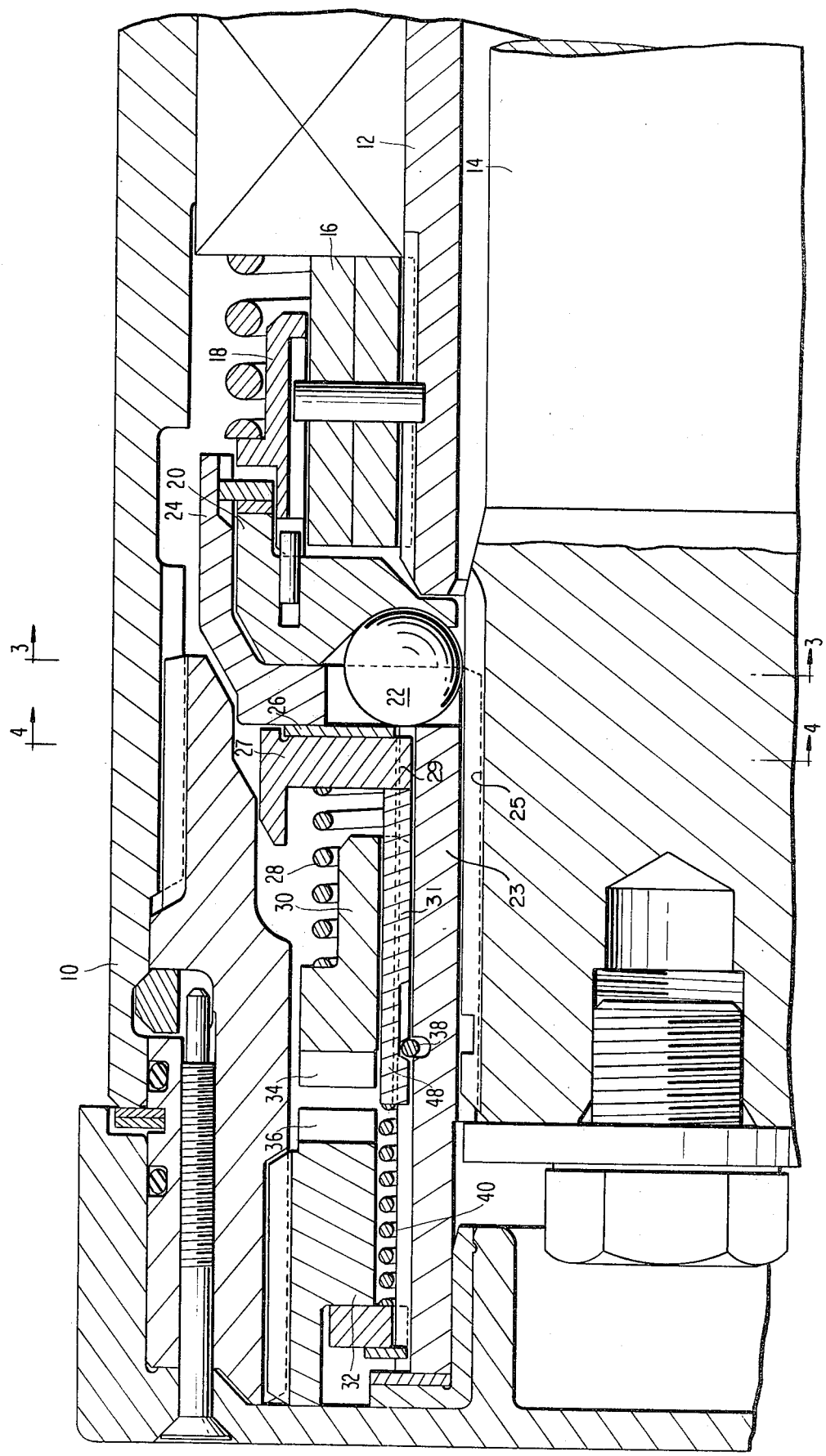
FIG. 1 is a partial upper longitudinal sectional view of the automatic hub clutch of the present invention in a disengaged mode.

There is shown in FIG. 1, the top half of a hub clutch for use in a four-wheel drive vehicle with the hub clutch being in a disengaged mode with the vehicle transfer case, not shown, being in a two-wheel drive. A wheel hub 10 is mounted upon a spindle 12 in a conventional manner for rotation with respect thereto. The spindle 12 is arranged in a spaced concentric relation thereto with a shaft 14 and secured to said spindle in a conventional manner. A lock washer 16 is carried by the spindle 12 and in turn it supports a locking clip 18 that has secured thereto, by any suitable means, a cam member 20 which has associated therewith a ball element 22. The spindle 12, lock nut 16, locking clip 18 and cam member 20 are non-rotative.

A control plate 24 encompasses the cam member 20 and terminates in an annular segment 23 which is splined at 25 to the axle shaft 14 for rotation therewith. The control plate 24 engages the ball element 22 and drives same up the ramp defined by the cam member 20 with the ball element engaging a race washer 26 that is secured, in concentric relation, to a face of a race washer cup 27 which is splined at 29 to the outer surface of the annular segment 23 of the control plate 24. The race washer cup 27 is provided with an engagement spring 28 which engages a sliding gear 30 that is splined at 31 to the outer surface of the annular segment 23 of the control plate 24. The wheel hub 10 has secured thereto a stationary gear 32 for rotation with said hub and the vehicle wheel, not shown, mounted thereon.

The sliding gear 30 is provided with axially outwardly extending face coupling teeth 34 while the stationary gear 32 is formed with inwardly directed face coupling teeth 36. The outer surface of the annular segment 23 of the control plate 24 is provided with a recess that receives a detent spring 38 which is engaged and encompassed by the sliding gear 30. Race washer cup 27 is moved along the splined ways of said control plate 24 under the action of the ball element 22 moving up the ramp of cam member 20. As the ball element 22 approaches the end of its travel up or along the cam surface or ramp, under the action of the control plate 24, the engagement spring 28 is compressed so that the race washer cup 27 engages the sliding gear 30. The race washer cup 27 upon contacting the gear 30 overcomes the action of the detent spring 38 whereby the engagement spring 28 forces the sliding gear 30 into engagement with the stationary gear 32 so that said gears are mechanically connected through the face coupling teeth 34 and 36.

The sliding movement of the race washer cut 27 and sliding gear 30 under the action of the ball element 22 moving along the cam ramp of the cam 20 causes a compressing of a disengagement spring 40. The spring 40 is interposed in concentric relation with the annular segment of the control plate 24 and the stationary gear 32. The engagement of the sliding gear 30 with the stationary gear 32 will enable torque to be transmitted from the shaft 14 to the hub 10 or from the hub 10 to the shaft 14. The control plate 24, ball element 22, cam member 20 and locking clip 18 tend to constitute a control assembly for moving the race washer cup and the sliding gear into engagement with the stationary gear.

The operation of a part-time drive line system with the automatic hub clutch of the present invention is much like that of one wherein the operator locks a pair of hubs manually to engage the drive axle and wheels except the vehicle operator is not required to get out of the vehicle to engage and disengage the hubs. The engagement of the stationary gear and the sliding gear is accomplished when the transfer case, not shown, is shifted to four-wheel drive and the front axle shafts rotate.

Figure 3:
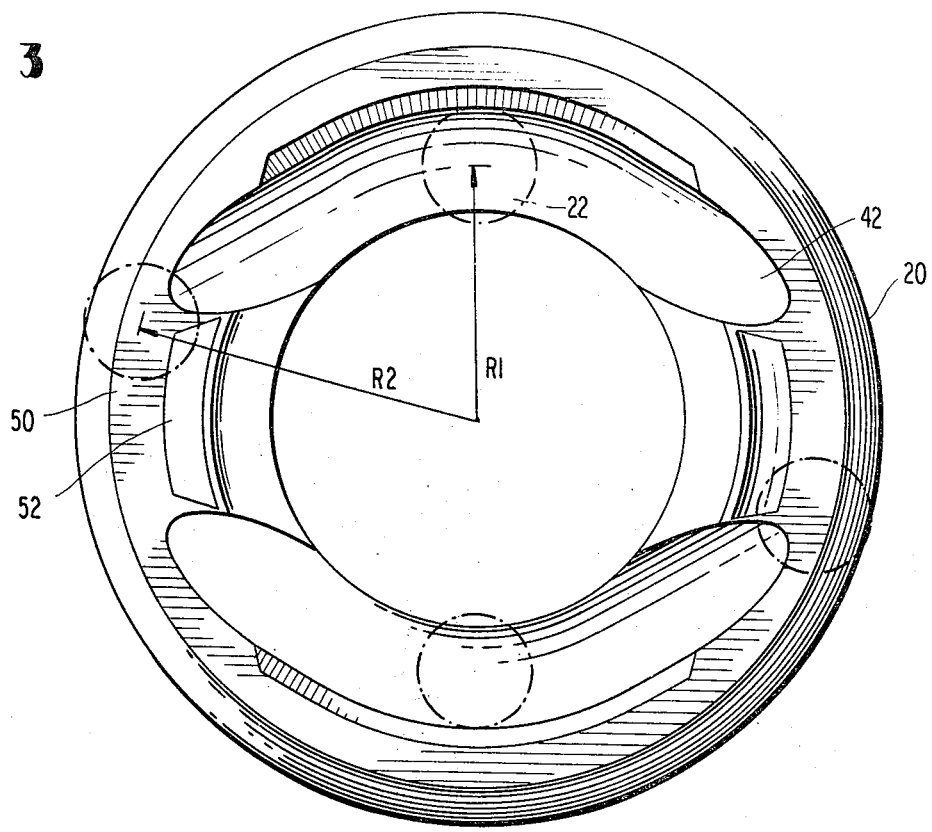
FIG. 3 is a vertical sectional view showing the control plate engaging the ball members and moving them into engagement with the cam surface, the view being taken on the line 3—3 of FIG. 1.
Figure 4:
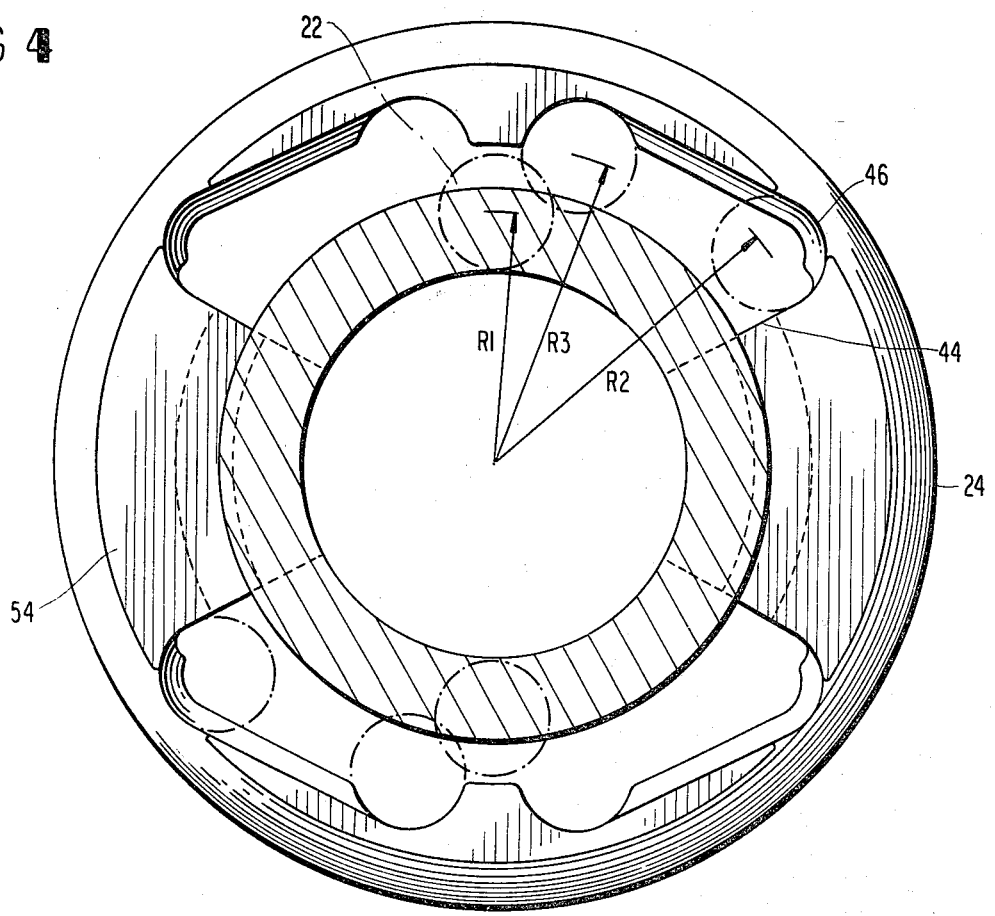
FIG. 4 is a vertical sectional view showing the ball members in a disengaged mode and an engaged mode, the view being taken on the line 4—4 of FIG. 1.

As shown in FIG. 4, the control plate 24 is adapted to engage two ball elements 22, one being in the upper half and the other in the lower half of the device. Inasmuch as the engagement and movement of the ball elements is identical in all respects, the following description will be directed to the ball element in the upper half. At the outset the ball element 22 will be located on the stationary cam ramp 42 at radius $R_1$, FIG. 3, so that when the transfer case is shifted into four-wheel drive the control plate 24 and shaft 14 will rotate in a counterclockwise direction for the purpose of moving the ball up the ramp 42 from $R_1$ to $R_2$, FIG. 3, in a substantially axial direction. The control plate 24 is configured to have a ball engaging surface 44 which is inclined with respect to the axis or center of the control plate for engaging the ball element at point $R_1$ and move same in a radial direction into a ball retaining segment or area 46. In this movement of the control plate the ball element 22 moves from $R_1$ to $R_2$ as the control plate 24 and shaft 12 rotate in a counterclockwise direction.

Figure 2:
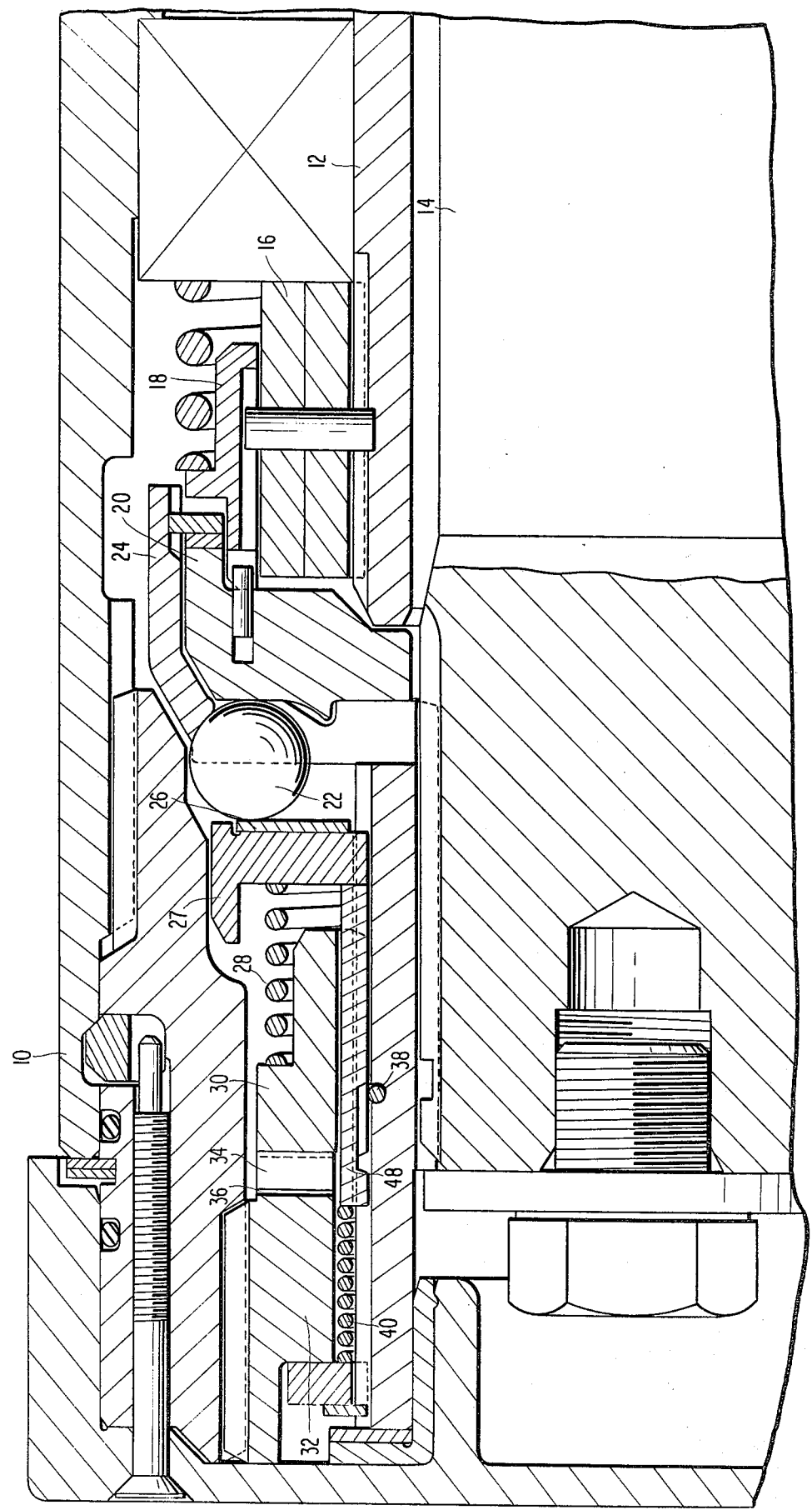
FIG. 2 is a view similar to FIG. 1 but showing the hub clutch in an engaged mode.

The rotation of the control plate 24 resulting in a radial movement of the ball element 22 will also cause the ball element to move up the ramp 42 of the fixed cam member 20 so as to engage the race washer cup 27 and move same axially to compress the engagement spring 28. This movement of the ball element 20 relieves the load of the disengagement spring 40 from the sliding gear 30 by moving the push ring 48 from the position shown in FIG. 1 to that as shown in FIG. 2. During this period the sliding gear 30 does not move as same is being held by the detent spring 38, but as the ball element 22 moves into position $R_2$, FIG. 3, the race washer cup 27 engages the sliding gear 30 overcoming the detent spring 38 so that the engagement spring 28 can force the sliding gear 30 into engagement with the stationary gear 32 whereby the face coupling teeth 34 will engage the face coupling teeth 36.

The positioning of the ball element 22 at $R_2$ with respect to the cam ramp 42, FIG. 3, and with respect to the control plate 24, FIG. 4, will lock the hub 10 to the axle shaft 12 so that torque will be transmitted from the shaft to the hub or from the hub to the shaft. As the axle shaft 12 continues to rotate the ball element 22 will roll on the cam member 20 at radius $R_2$ on the outer peripheral surface 50, FIG. 3, which is a surface that does not intersect the cam ramp 42 thereby preventing inadvertent disengagement of the ball element 22 from the cam member.

When the vehicle operator desires to have two-wheel drive operation and disengagement of the front wheel drive components, this can be accomplished through reversing the vehicle with the transfer case in two-wheel drive.

The reversal movement of shaft 12 and control plate 24 causes the ball element 22 to roll along area or segment 46 from position $R_2$ to $R_3$ wherein the cam ramp 42 is intersected. As the ball element 22 rotates with the control plate 24 to point $R_3$ where it intersects the cam ramp the ball moves down the ramp 42 to the point of disengagement which is designated $R_1$. Upon the ball element 22 reaching point $R_1$ the load on the engagement spring 28 through the race washer cup 27 is relieved so that the sliding gear 30 is forced out of engagement with the stationary gear 32 and over the detent spring 38 by the disengagement spring 40. The axle shaft 12 then stops rotating and is disconnected from the hub. The cam member 20 is provided with a cam fence 52 that is interposed between the respective ends of the cam ramps 42, FIG. 3, for maintaining the ball elements on the surface 50 during the rotation of the control plate 24 and axle shaft 12. The control plate 24 is formed with suitable recesses 54 to accommodate the cam fence 52 during the rotation of the control plate and axle shaft.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An automatic clutch for effecting a driving connection between a rotatable power shaft and a wheel hub, the combination comprising:
    (a) a non-rotative cam member having a cam ramp;
    (b) a control plate keyed to said power shaft and positioned adjacent to said cam member;
    (c) a ball element interposed between said control plate and said cam ramp;
    (d) a race washer cup and race washer arranged in concentric relation to said power shaft and engagable by said ball element;
    (e) a gear affixed to said wheel hub in concentric relation to said power shaft;
    (f) a gear slidably mounted on said control plate with an engagement spring interposed between said race washer cup and said gear; and
    (g) said control plate rotatably engaging said ball element upon the rotation of said shaft and moving said ball element up said ramp for engaging and moving said race washer cup axially of said shaft and into engagement with said sliding gear to force said sliding gear towards said fixed gear.

2. An automatic clutch as set forth in claim 1 wherein said control plate is formed with an elongated annular segmental portion that is provided with splines engagable with splines formed on said shaft.

3. An automatic clutch as set forth in claim 2 wherein said race washer cup and said sliding gear are splined to the segmental portion of said control plate.

4. An automatic clutch as set forth in claim 3 wherein said fixed gear has a disengagement spring associated therewith.

5. An automatic clutch as set forth in claim 4 wherein a push ring is interposed between said disengagement spring and said race washer cup.

6. An automatic clutch as set forth in claim 5 wherein the segmental portion of said control plate is provided with a detent spring, said ball element during a protion of its movement over said cam ramp engaging said race washer and race washer cup, and compressing said engagement spring while said sliding gear is retained by said detent spring.

7. An automatic clutch as set forth in claim 6 wherein said ball element upon continued movement over said cam ramp by said control plate moves said race cup into engagement with said sliding gear to compress said engagement spring and move said sliding gear over said detent spring and permitting said sliding gear to be moved into engagement with the fixed gear under the action of said engagement spring.

8. An automatic clutch as set forth in claim 7 wherein said push ring is moved with said race washer cup for compressing said disengagement spring.

9. An automatic clutch as set forth in claim 1 wherein said fixed gear is formed with face coupling teeth engagable with face coupling teeth provided on said sliding gear.

10. An automatic clutch as set forth in claim 1 wherein said cam member is of annular configuration and concentrically arranged with respect to said shaft with a cam ramp with the low point of the ramp being at the inner portion adjacent said shaft and the high point of the ramp being adjacent the outer peripheral surface of the cam member with said ball element moving up said ramp and onto the outer peripheral surface under the rotative action of said control plate.

11. An automatic clutch as set forth in claim 1 wherein said cam member is provided with at least one cam ramp with a ball element positioned thereon at a radius of $R_1$ from the center of the cam member, said ball element being moved over said ramp to radius point $R_2$ which is the high point of the cam beyond said ramp under the rotative movement of said control plate.

12. An automatic clutch as set forth in claim 1 wherein said control plate engages a ball element, on said cam ramp, at point R, which is a radii emanating from the center of said plate and denotes a disengaging low point on said cam ramp, said plate upon the counterclockwise rotation of said shaft having a ball engaging surface for forcing the ball element up said cam ramp to point $R_2$ which is the radius of the ball from the center of said control plate as said sliding gear is moved into meshing engagement with said stationary gear.

13. An automatic clutch as set forth in claim 12 wherein said ball element in moving from point $R_1$ to point $R_2$ under the action of said control plate engages said race washer cup.

14. An automatic clutch as set forth in claim 12 wherein said control plate is formed with a ball retaining segment for moving said ball over the outer peripheral surface of said cam member under the rotation of said shaft.

15. An automatic clutch as set forth in claim 14 wherein said ball retaining segment upon the clockwise rotation of said shaft moves said ball from $R_2$ to $R_3$ which is the rolling radius of the ball on said control plate wherein the cam ramp is intersected and the ball moves down the cam ramp to point $R_1$.

* * * * *